United States Patent
McIntosh et al.

(10) Patent No.: US 12,265,404 B2
(45) Date of Patent: Apr. 1, 2025

(54) FLOW CONTROL DEVICE AND METHOD OF PRESSURE CONTROL IN A FLUID FLOW

(71) Applicant: FISHER CONTROLS INTERNATIONAL LLC, Marshalltown, IA (US)

(72) Inventors: Ryan McIntosh, Marshalltown, IA (US); Ryan Nelson, Nevada, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 42 days.

(21) Appl. No.: 18/237,285

(22) Filed: Aug. 23, 2023

(65) Prior Publication Data
US 2025/0068192 A1    Feb. 27, 2025

(51) Int. Cl.
*F16K 31/06*     (2006.01)
*G05D 16/16*     (2006.01)

(52) U.S. Cl.
CPC ........... *G05D 16/163* (2013.01); *F16K 31/06* (2013.01)

(58) Field of Classification Search
CPC .............................. F16K 31/06; G05D 16/163
See application file for complete search history.

(56) References Cited

U.S. PATENT DOCUMENTS

| | | | |
|---|---|---|---|
| 6,082,705 A * | 7/2000 | Arvidsson ........... | A61M 16/206 251/129.17 |
| 2013/0195634 A1* | 8/2013 | Mashima ............ | F04D 25/0613 415/191 |
| 2020/0003313 A1* | 1/2020 | Kuramochi ............. | H01F 7/081 |
| 2021/0048009 A1* | 2/2021 | Tano ........................ | F04B 27/18 |

* cited by examiner

*Primary Examiner* — P. Macade Nichols
(74) *Attorney, Agent, or Firm* — MARSHALL, GERSTEIN & BORUN LLP

(57) ABSTRACT

A flow control device includes a housing forming an inlet passage, an outlet passage, and a fluid passageway between the inlet passage and the outlet passage. A magnetized shaft is positioned entirely within the housing between the inlet passage and the outlet passage and a plurality of vanes are secured to the magnetized shaft and positioned in the fluid passageway. A first wire coil is moveably positioned around a first end of the magnetized shaft, external of the housing, and is linearly moveable in a direction parallel to a longitudinal axis of the magnetized shaft.

20 Claims, 13 Drawing Sheets

FLOW CONTROL DEVICE AND METHOD OF PRESSURE CONTROL IN A FLUID FLOW

FIELD OF THE DISCLOSURE

This disclosure relates generally to control devices and, more particularly, to flow control devices for pressure control in a fluid flow.

BACKGROUND

In typical flow control devices, such as control valves, a shaft, valve stem, or other structure typically extends through the wall of a housing in order to control an internal element, such as a valve plug, in order to control the pressure through the device. Having a structure that extends through the housing can provide an external leak path through the housing and requires packing to seal the area between the structure and the opening in the housing, which can allow fugitive emissions to be emitted from typical flow control devices, especially when used in processes at elevated temperatures. This can be particularly problematic for flow control devices used in hazardous processes, which can possibly allow fugitive emissions of a hazardous material. In addition, packing friction can cause issues sizing an actuator large enough to handle the forces.

BRIEF SUMMARY OF THE DISCLOSURE

In accordance with one exemplary aspect of the present invention, a flow control device comprises a housing forming an inlet passage, an outlet passage, and a fluid passageway between the inlet passage and the outlet passage. A magnetized shaft is positioned entirely within the housing between the inlet passage and the outlet passage and a plurality of vanes are secured to the magnetized shaft and positioned in the fluid passageway. A first wire coil is moveably positioned around a first end of the magnetized shaft, the first wire coil being external of the housing and linearly moveable in a direction parallel to a longitudinal axis of the magnetized shaft.

In further accordance with any one or more of the foregoing exemplary aspects of the present invention, the flow control device may further include, in any combination, any one or more of the following preferred forms.

In one preferred form, the flow control device comprises a first radial flange extending around and positioned at an end of the inlet passage and a second radial flange extending around and positioned at an end of the outlet passage.

In another preferred form, the flow control device comprises a first cavity formed in the housing, the first cavity extending from the fluid passageway and configured to receive the first end of the magnetized shaft.

In another preferred form, the first wire coil is positionable around the first cavity.

In another preferred form, the flow control device comprises a second wire coil moveably positioned around a second end of the magnetized shaft, the second wire coil being external of the housing and linearly moveable in a direction parallel to the longitudinal axis of the magnetized shaft.

In another preferred form, the flow control device comprises a second cavity formed in the housing, the second cavity extending from the fluid passageway and configured to receive a second end of the magnetized shaft, wherein the second wire coil is positionable around the second cavity.

In another preferred form, the flow control device comprises a second magnetized shaft positioned entirely within the housing between the inlet passage and the outlet passage. The plurality of vanes are secured to the second magnetized shaft and a second wire coil is moveably positioned around a second end of the second magnetized shaft. The second wire coil is external of the housing and linearly moveable in a direction parallel to the longitudinal axis of the second magnetized shaft.

In accordance with another exemplary aspect of the present invention, a flow control device comprises a housing forming an inlet passage, an outlet passage, and a fluid passageway between the inlet passage and the outlet passage. A shaft is positioned entirely within the housing between the inlet passage and the outlet passage and a first magnet is secured to the shaft proximate a first end of the shaft. A plurality of vanes are secured to the shaft and positioned in the fluid passageway. A first wire coil is moveably positioned around the first end of the shaft, the first wire coil being external of the housing and linearly moveable in a direction parallel to a longitudinal axis of the shaft.

In further accordance with any one or more of the foregoing exemplary aspects of the present invention, the flow control device may further include, in any combination, any one or more of the following preferred forms.

In one preferred form, the flow control device comprises a first radial flange extending around and positioned at an end of the inlet passage and a second radial flange extending around and positioned at an end of the outlet passage.

In another preferred form, the flow control device comprises a first cavity formed in the housing, the first cavity extending from the fluid passageway and configured to receive the first end of the shaft.

In another preferred form, the first wire coil is positionable around the first cavity.

In another preferred form, the flow control device comprises a second magnet secured to the shaft proximate a second end of the shaft, opposite the first end of the shaft, and a second wire coil moveably positioned around the second end of the shaft. The second wire coil is external of the housing and linearly moveable in a direction parallel to the longitudinal axis of the shaft.

In another preferred form, the flow control device comprises a second cavity formed in the housing, the second cavity extending from the fluid passageway and configured to receive the second end of the shaft, wherein the second wire coil is positionable around the second cavity.

In another preferred form, the flow control device comprises a second shaft positioned entirely within the housing between the inlet passage and the outlet passage. The plurality of vanes are secured to the second shaft. A second magnet is secured to the second shaft proximate a second end of the second shaft and a second wire coil is moveably positioned around the second end of the second shaft, the second wire coil being external of the housing and linearly moveable in a direction parallel to the longitudinal axis of the second shaft.

In accordance with another exemplary aspect of the present invention, a method of pressure control in a fluid flow comprises: positioning a shaft entirely within a housing, the housing forming an inlet passage, an outlet passage, and a fluid passageway between the inlet passage and the outlet passage; securing a plurality of vanes to the shaft and positioning the plurality of vanes in the fluid passageway; positioning a first wire coil around a first end of the shaft, the first wire coil being external of the housing and linearly moveable in a direction parallel to a longitudinal axis of the shaft; positioning the housing in a path of the fluid flow; and moving the first wire coil relative to the first end of the shaft to control the pressure in the fluid flow.

In further accordance with any one or more of the foregoing exemplary aspects of the present invention, the method may further include, in any combination, any one or more of the following preferred forms.

In one preferred form, the shaft is magnetized.

In another preferred from, the method comprises securing a magnet proximate the first end of the shaft.

In another preferred from, the method comprises positioning a second wire coil around a second end of the shaft, the second wire coil being external of the housing and linearly moveable in a direction parallel to the longitudinal axis of the shaft, and moving the second wire coil relative to the second end of the shaft to control the pressure in the fluid flow.

In another preferred from, the method comprises: positioning a second shaft entirely within the housing; securing the plurality of vanes to the second shaft; positioning a second wire coil around a second end of the second shaft, the second wire coil being external of the housing and linearly moveable in a direction parallel to a longitudinal axis of the second shaft; and moving the second wire coil relative to the second end of the second shaft to control the pressure in the fluid flow.

In another preferred from, the second shaft is magnetized or a second magnet is secured proximate the second end of the second shaft.

DETAILED DESCRIPTION

The examples disclosed herein relate to flow control devices and method of pressure control in fluid flow using flow control devices. The example flow control devices disclosed herein include magnetic shafts and vanes (rotors) that are entirely within an housing and wire coils (stators) that are external of the housing and use magnetic induction to provide resistance against the rotation of the shaft and vanes to control the pressure drop through the flow control device. The use of shafts and vanes entirely within the housing and wire coils external of the housing provides a sealed device with no external leak paths and no emissions. Unlike typical control valves, the example flow control devices are controlled externally and no packing is required since there is no shaft, valve stem, or other structure that extends through the housing in order to control an internal element, thereby eliminating fugitive emissions that can be emitted from typical pressure control devices.

The example flow control devices disclosed herein can also be used to generate power to charge or power other devices by converting the energy from the process flow via the shaft and vanes and magnetic induction. The energy created can be monitored and harvested, thus reducing the carbon footprint.

The example flow control devices disclosed herein can also be used as flow measurement devices by correlating the pulses coming off of the shaft being captured by the wire coils.

The example flow control devices disclosed herein also have the potential of being used to diagnose bearing wear and failure. By first calibrating the resistance provided by the flow control device at a certain fluid flow, and then monitoring the resistance over time, it can be estimated when a bearing is becoming worn or has failed.

Figure 1:
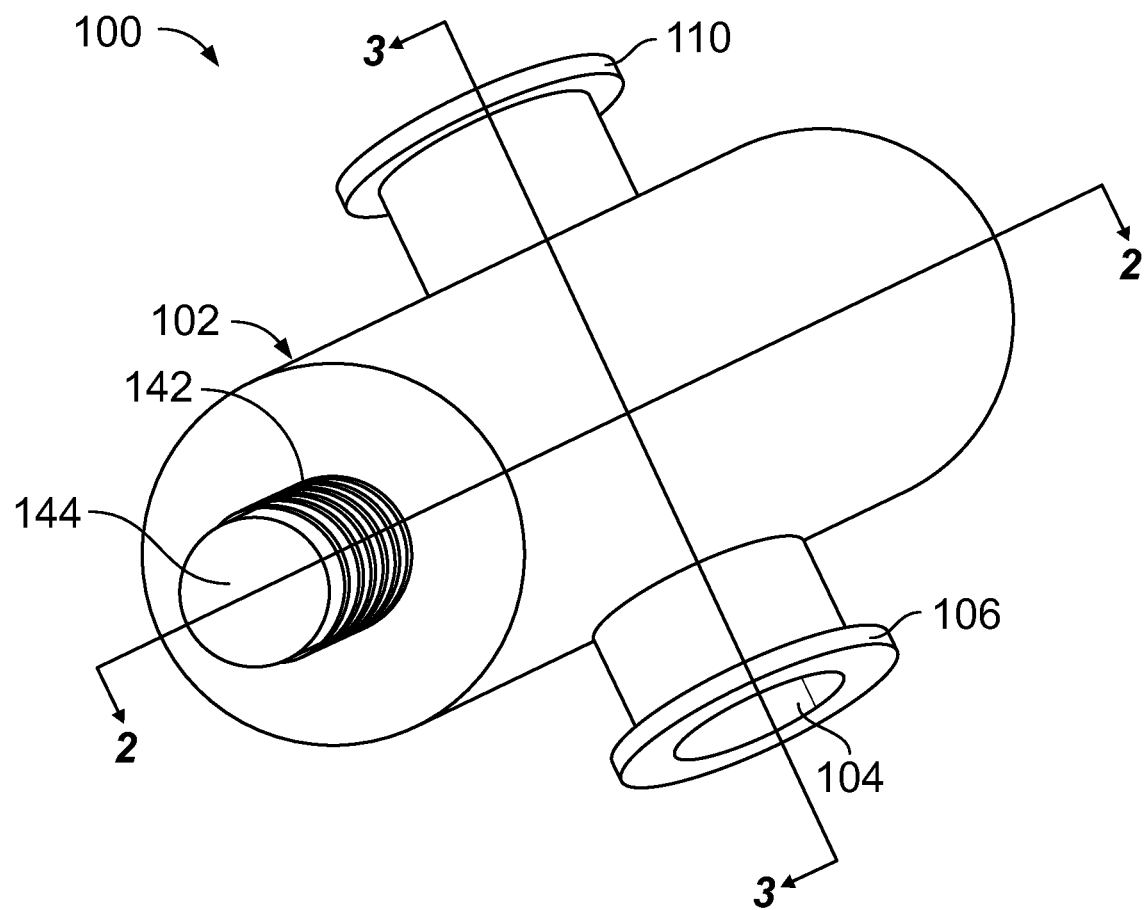
FIG. 1 illustrates a perspective view of a first example flow control device.
Figure 2:
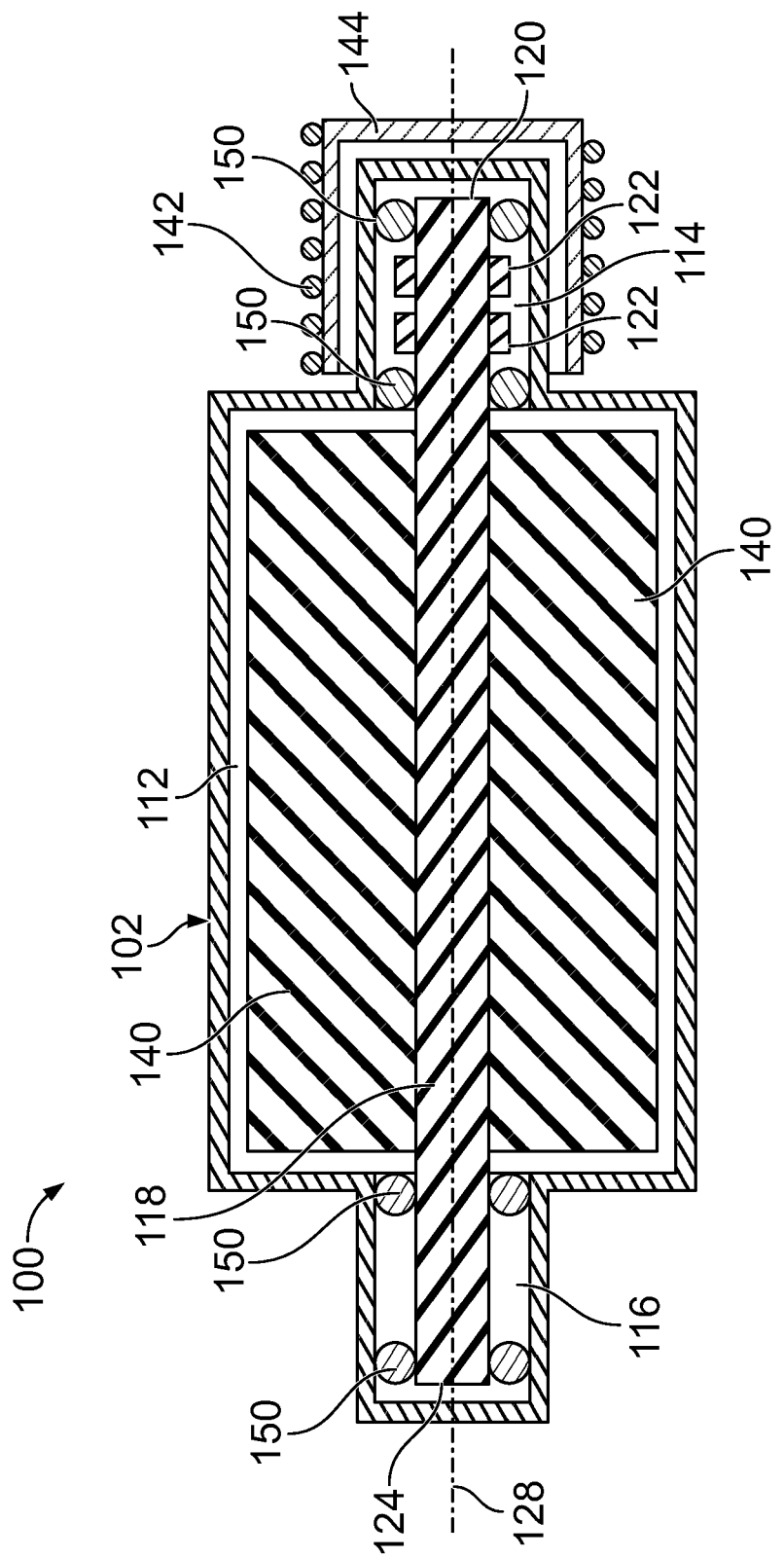
FIG. 2 illustrates a cross-sectional view of the flow control device of FIG. 1, taken along line 2-2 in FIG. 1.
Figure 3:
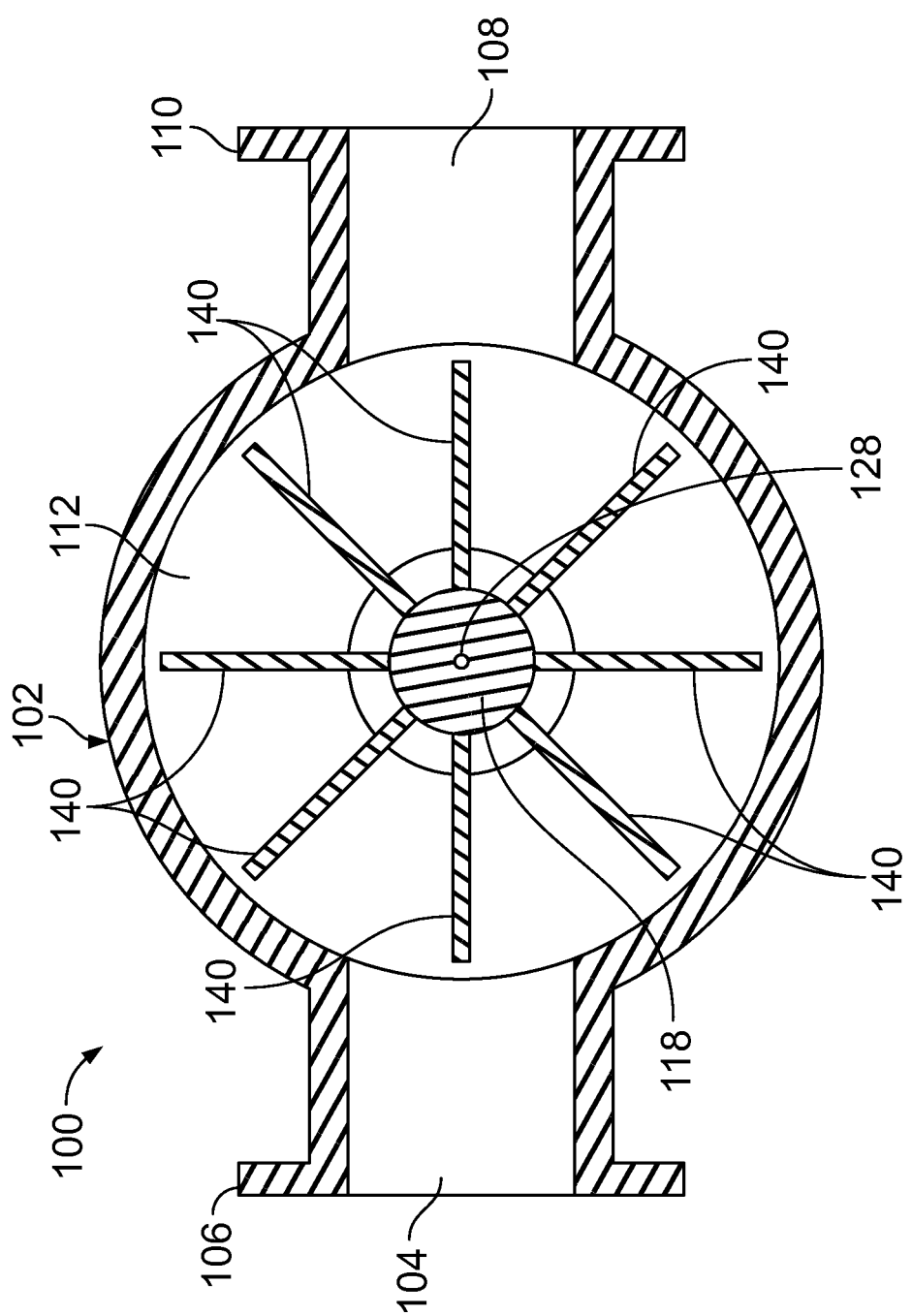
FIG. 3 illustrates a cross-sectional view of the flow control device of FIG. 1, taken along line 3-3 in FIG. 1.

Referring to FIGS. 1-3, a first example flow control device 100 includes a housing 102 that forms an inlet passage 104, an outlet passage 108, and a fluid passageway 112 between inlet passage 104 and outlet passage 108. A first radial flange 106 can extend around and be positioned at an end of inlet passage 104 and a second radial flange 110 can extend around and be positioned at an end of outlet passage 108 to allow flow control device 100 to be installed in a fluid system and to maintain face-to-face requirements, making flow control device 100 retrofittable in place of existing pressure control valves.

A shaft 118 is positioned entirely within housing 102 between inlet passage 104 and outlet passage 108, such that no portion of shaft 118 extends external to housing 102. As shown, shaft 118 can have at least one first magnet 122 secured to shaft 118 proximate a first end 120 of shaft 118 forming a rotor. Alternatively, rather than securing magnets to the shaft, shaft 118 itself can be magnetized, eliminating the need for first magnet 122. A first cavity 114 is formed in housing 102 and extends outwardly from fluid passageway 112 and a second cavity 116 is formed in housing 102, opposite first cavity 114, and extends outwardly from fluid passageway 112. First end 120 of shaft 118 is received in first cavity 114 and a second end 124 of shaft 118 is received in second cavity 116. One or more bearings, O-rings, or other seals 150 can be positioned around first end 120 and second end 124 of shaft 118 to support shaft 118 in first cavity 114 and second cavity 116 and allow rotation of shaft 118 in first cavity 114 and second cavity 116. Providing shaft 118 entirely within housing 102 creates a sealed device with no external leak path and, therefore, no emissions. In addition, no packing is required since there is no shaft, valve stem, or other structure extending through or external of housing 102 to control any internal element.

A plurality of vanes 140 are secured to and extend radially from shaft 118 and are positioned in fluid passageway 112 to form a type of paddle wheel or turbine. Vanes 140 can have various shapes and/or sizes that will allow fluid flowing through housing 102 to engage vanes 140 and provide a force against vanes 140 to turn shaft 118. Efficiency gains can also be realized by changing the size/shape of vanes 140 and/or the size/shape of housing 102 (e.g., angle body, Y body, etc.). Vanes 140 can be secured to shaft 118 in any manner desired, such as bolting vanes 140 to shaft 118, welding vanes 140 to shaft 118, press fitting vanes 140 to shaft 118, fitting vanes 140 into grooves machined into shaft 118, threading bars into shaft 118 and attaching vanes 140 to the bars, etc. Vanes 140 can be secured to shaft 118 after shaft 118 has been positioned within housing 102 or vanes 140 can be secured to shaft 118 outside of housing 102 and shaft 118 and vanes 140 positioned within housing 102 as a unit. Alternatively, rather than separate vanes being secured to the shaft, vanes 140 and shaft 118 could be a single, integral, unitary structure (e.g., vanes 140 and shaft 118 could be machined or 3D printed as a single unit).

A first wire coil 142 is positioned around first end 120 of shaft 118 and, in the example shown, around first magnet 122 forming a stator. First wire coil 142 is external of housing 102 such that it is positioned around first cavity 114 and is linearly moveable in a direction parallel to a longitudinal axis 128 of shaft 118. First wire coil 142 can be a single coil of wire or can includes multiple coils mounted in series in a cylindrical pattern. As shown, first wire coil 142 can be wrapped around and mounted to a generally cylindrical non-magnetic armature 144, which can be connected to an actuator (e.g., and electrical or pneumatic actuator) (not shown) to move armature 144, and therefore first wire coil 142, linearly back and forth along longitudinal axis 128 of shaft 118.

As fluid flows through flow control device 100, the fluid engages plurality of vanes 140 and rotates shaft 118. Moving first wire coil 142 over shaft 118, and first magnet 122 if used, creates a current in first wire coil 142 and creates electromagnetic induction, which slows the rotation of shaft 118 and increases the pressure drop in flow control device 100. First wire coil 142 can be moved toward housing 102, which will cause more of shaft 118 (and first magnet 122) to be covered by first wire coil 142, increasing the induced magnetic field, increasing the resistance to the flow of the fluid, and increasing the pressure drop. Conversely, first wire coil 142 can also be moved away from housing 102, which will cause less of shaft 118 (and first magnet 122) to be covered by first wire coil 142, decreasing the induced magnetic field, decreasing the resistance to flow of the fluid, and decreasing the pressure drop. Therefore, the pressure drop created by flow control device 100 can be controlled by the positioning of first wire coil 142 over first end 120 of shaft 118 (and first magnet 122).

Figure 4:
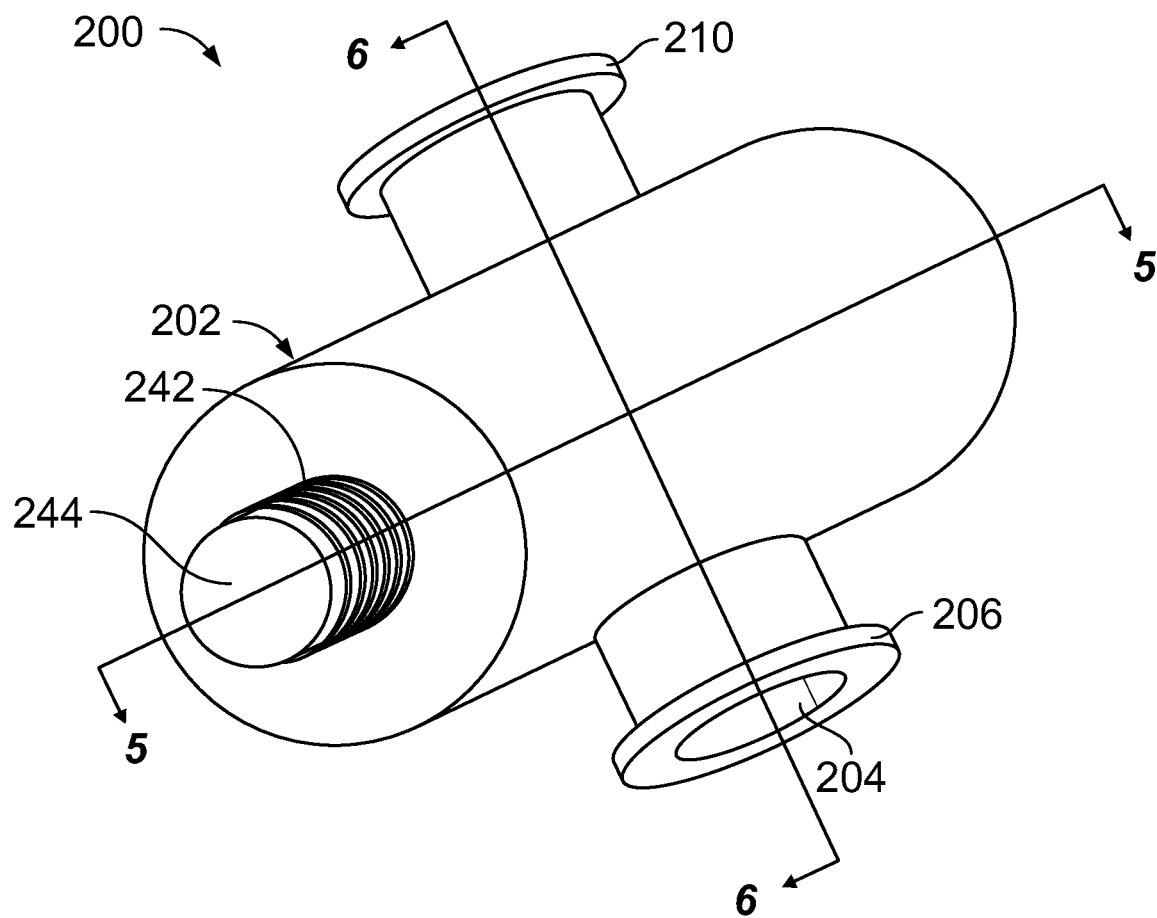
FIG. 4 illustrates a perspective view of a second example flow control device.
Figure 5:
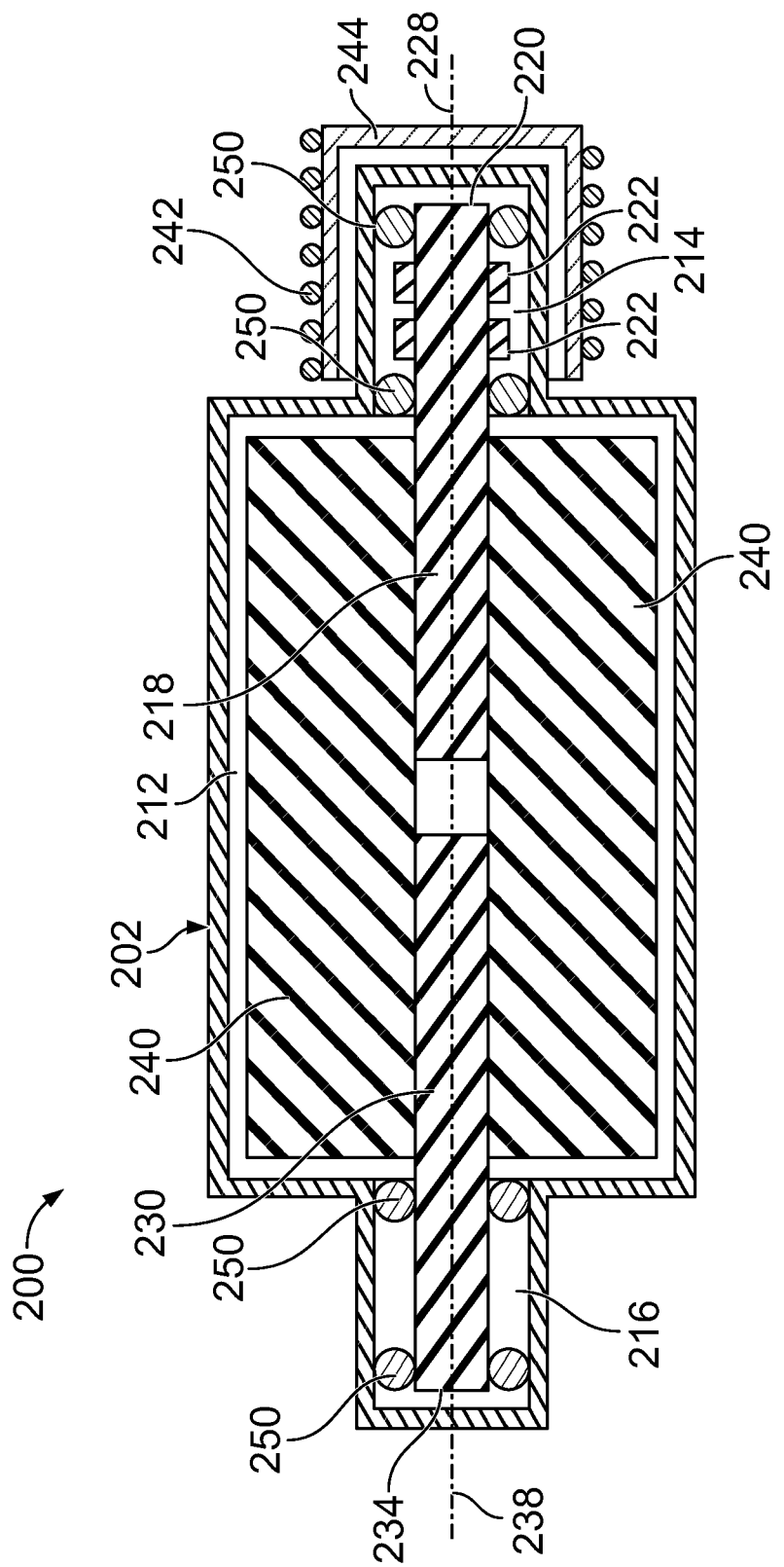
FIG. 5 illustrates a cross-sectional view of the flow control device of FIG. 4, taken along line 5-5 in FIG. 4.
Figure 6:
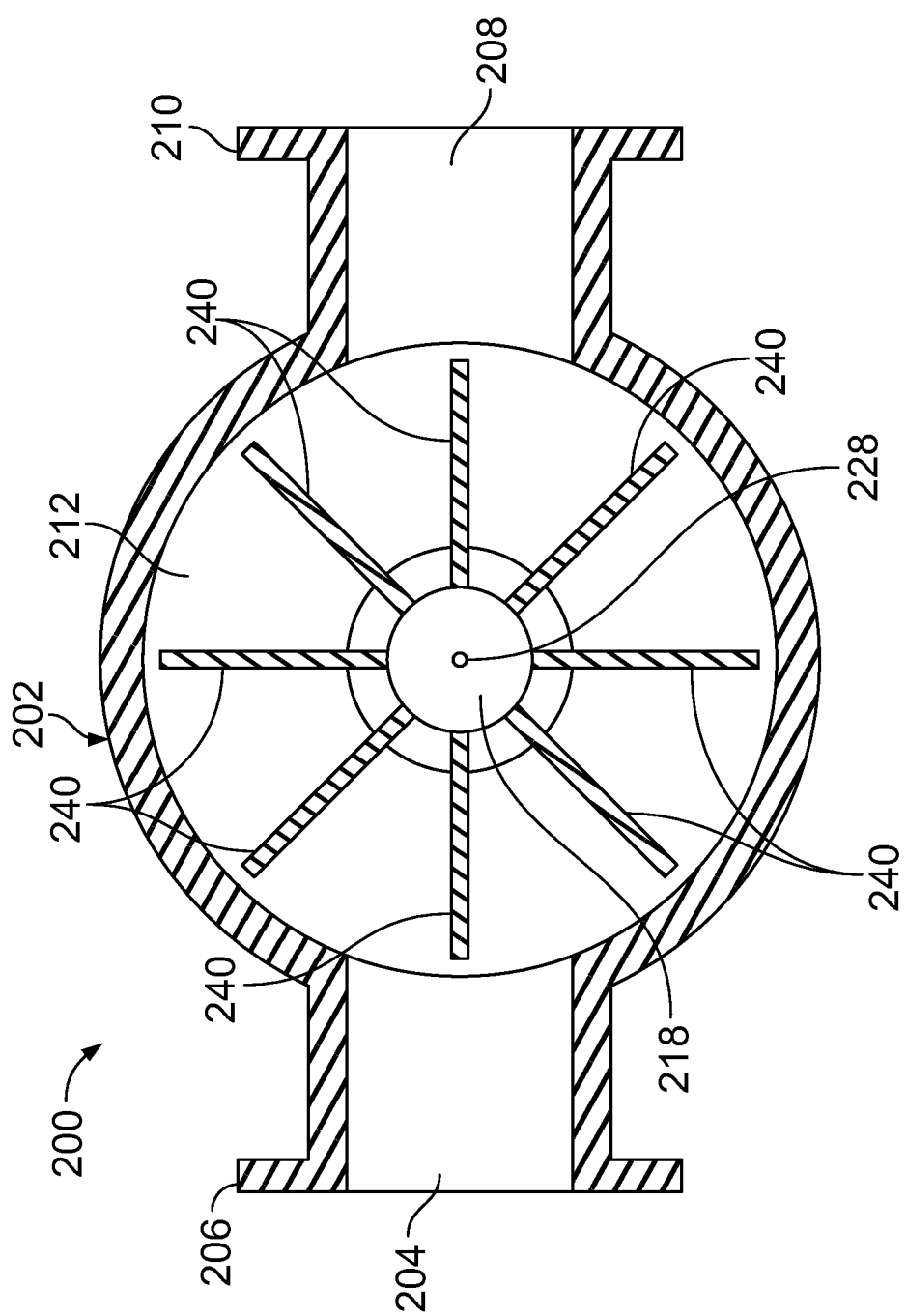
FIG. 6 illustrates a cross-sectional view of the flow control device of FIG. 4, taken along line 6-6 in FIG. 4.

Referring to FIGS. 4-6, a second example flow control device 200 includes a housing 202 that forms an inlet passage 204, an outlet passage 208, and a fluid passageway 212 between inlet passage 204 and outlet passage 208. A first radial flange 206 can extend around and be positioned at an end of inlet passage 204 and a second radial flange 210 can extend around and be positioned at an end of outlet passage 208 to allow flow control device 200 to be installed in a fluid system and to maintain face-to-face requirements, making flow control device 200 retrofittable in place of existing pressure control valves.

A shaft 218 and a second shaft 230 are coaxially aligned and are positioned entirely within housing 202 between inlet passage 204 and outlet passage 108, such that no portion of shaft 218 or second shaft 230 extends external to housing 202. As shown, shaft 218 can have at least one first magnet 222 secured to shaft 218 proximate a first end 220 of shaft 218 forming a rotor. Alternatively, rather than securing magnets to the shaft, shaft 218 itself can be magnetized, eliminating the need for first magnet 222. A first cavity 214 is formed in housing 202 and extends outwardly from fluid passageway 212 and a second cavity 216 is formed in housing 202, opposite first cavity 214, and extends outwardly from fluid passageway 212. First end 220 of shaft 218 is received in first cavity 214 and a second end 234 of second shaft 230 is received in second cavity 216. One or more bearings, O-rings, or other seals 250 can be positioned around first end 220 of shaft 218 and second end 234 of second shaft 230 to support shaft 218 in first cavity 214 and second shaft 230 in second cavity 216 and allow rotation of shaft 218 in first cavity 214 and second shaft 230 in second cavity 216. Providing shaft 218 and second shaft 230 entirely within housing 202 creates a sealed device with no external leak path and, therefore, no emissions. In addition, no packing is required since there is no shaft, valve stem, or other structure extending through or external of housing 202 to control any internal element.

A plurality of vanes 240 are secured to and extend radially from shaft 218 and second shaft 230 and are positioned in fluid passageway 212 to form a type of paddle wheel or turbine. Vanes 240 can have various shapes and/or sizes that will allow fluid flowing through housing 202 to engage vanes 240 and provide a force against vanes 240 to turn shaft 218 and second shaft 230. Efficiency gains can also be realized by changing the size/shape of vanes 240 and/or the size/shape of housing 202 (e.g., angle body, Y body, etc.). Vanes 240 can be secured to shaft 218 and second shaft 230 in any manner desired, such as bolting vanes 240 to shaft 218 and second shaft 230, welding vanes 240 to shaft 218 and second shaft 230, press fitting vanes 240 to shaft 218 and second shaft 230, fitting vanes 240 into grooves machined into shaft 218 and second shaft 230, threading bars into shaft 218 and second shaft 230 and attaching vanes 240 to the bars, etc. Vanes 240 can be secured to shaft 218 and second shaft 230 after shaft 218 and second shaft 230 have been positioned within housing 202 or vanes 240 can be secured to shaft 218 and second shaft 230 outside of housing 202 and shaft 218, second shaft 230, and vanes 240 positioned within housing 202 as a unit. Alternatively, rather than separate vanes being secured to the shaft, vanes 240, shaft 218, and second shaft 230 could be a single, integral, unitary structure (e.g., vanes 240, shaft 218, and second shaft 230 could be machined or 3D printed as a single unit).

A first wire coil 242 is positioned around first end 220 of shaft 218 and, in the example shown, around first magnet 222 forming a stator. First wire coil 242 is external of housing 202 such that it is positioned around first cavity 214 and is linearly moveable in a direction parallel to a longitudinal axis 228 of shaft 218 and a longitudinal axis 238 of second shaft 230. First wire coil 242 can be a single coil of wire or can includes multiple coils mounted in series in a cylindrical pattern. As shown, first wire coil 242 can be wrapped around and mounted to a generally cylindrical non-magnetic armature 244, which can be connected to an actuator (e.g., and electrical or pneumatic actuator) (not shown) to move armature 244, and therefore first wire coil 242, linearly back and forth along longitudinal axis 228 of shaft 218.

As fluid flows through flow control device 200, the fluid engages plurality of vanes 240 and rotates shaft 218 and second shaft 230. Moving first wire coil 242 over shaft 218, and first magnet 222 if used, creates a current in first wire coil 242 and creates electromagnetic induction, which slows the rotation of shaft 218 and increases the pressure drop in flow control device 200. First wire coil 242 can be moved toward housing 202, which will cause more of shaft 218 (and first magnet 222) to be covered by first wire coil 242, increasing the induced magnetic field, increasing the resistance to the flow of the fluid, and increasing the pressure drop. Conversely, first wire coil 242 can also be moved away from housing 202, which will cause less of shaft 218 (and first magnet 222) to be covered by first wire coil 242, decreasing the induced magnetic field, decreasing the resistance to flow of the fluid, and decreasing the pressure drop. Therefore, the pressure drop created by flow control device 200 can be controlled by the positioning of first wire coil 242 over first end 220 of shaft 218 (and first magnet 222).

Figure 7:
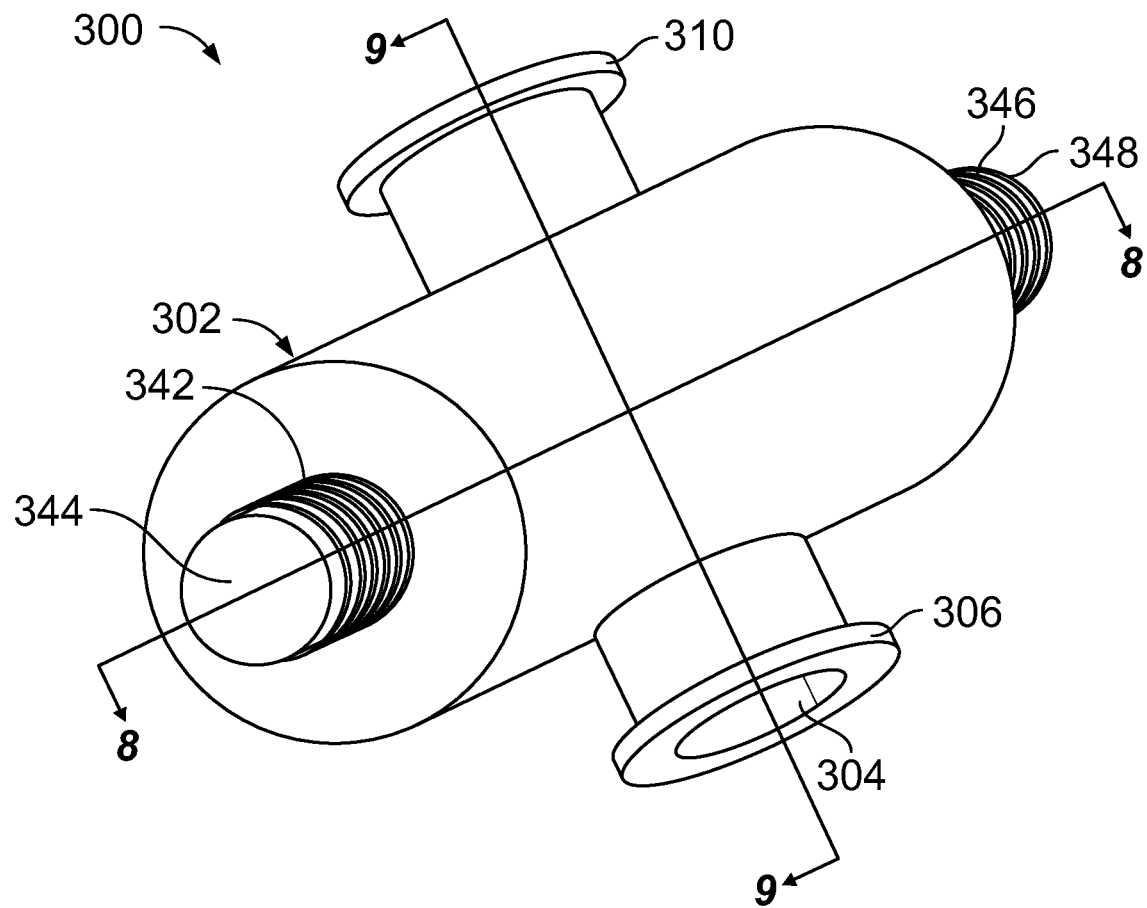
FIG. 7 illustrates a perspective view of a third example flow control device.
Figure 8:
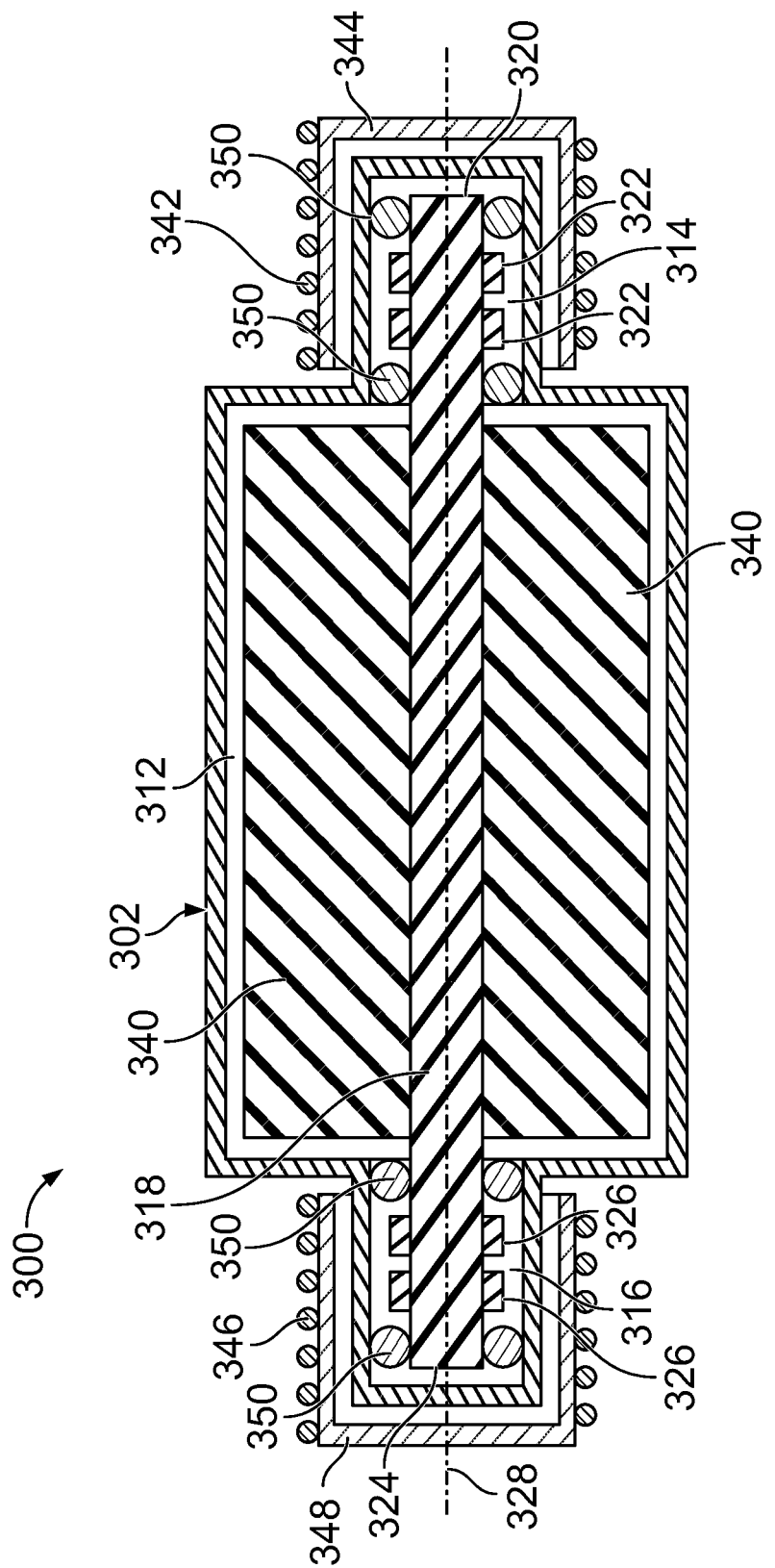
FIG. 8 illustrates a cross-sectional view of the flow control device of FIG. 7, taken along line 8-8 in FIG. 7.
Figure 9:
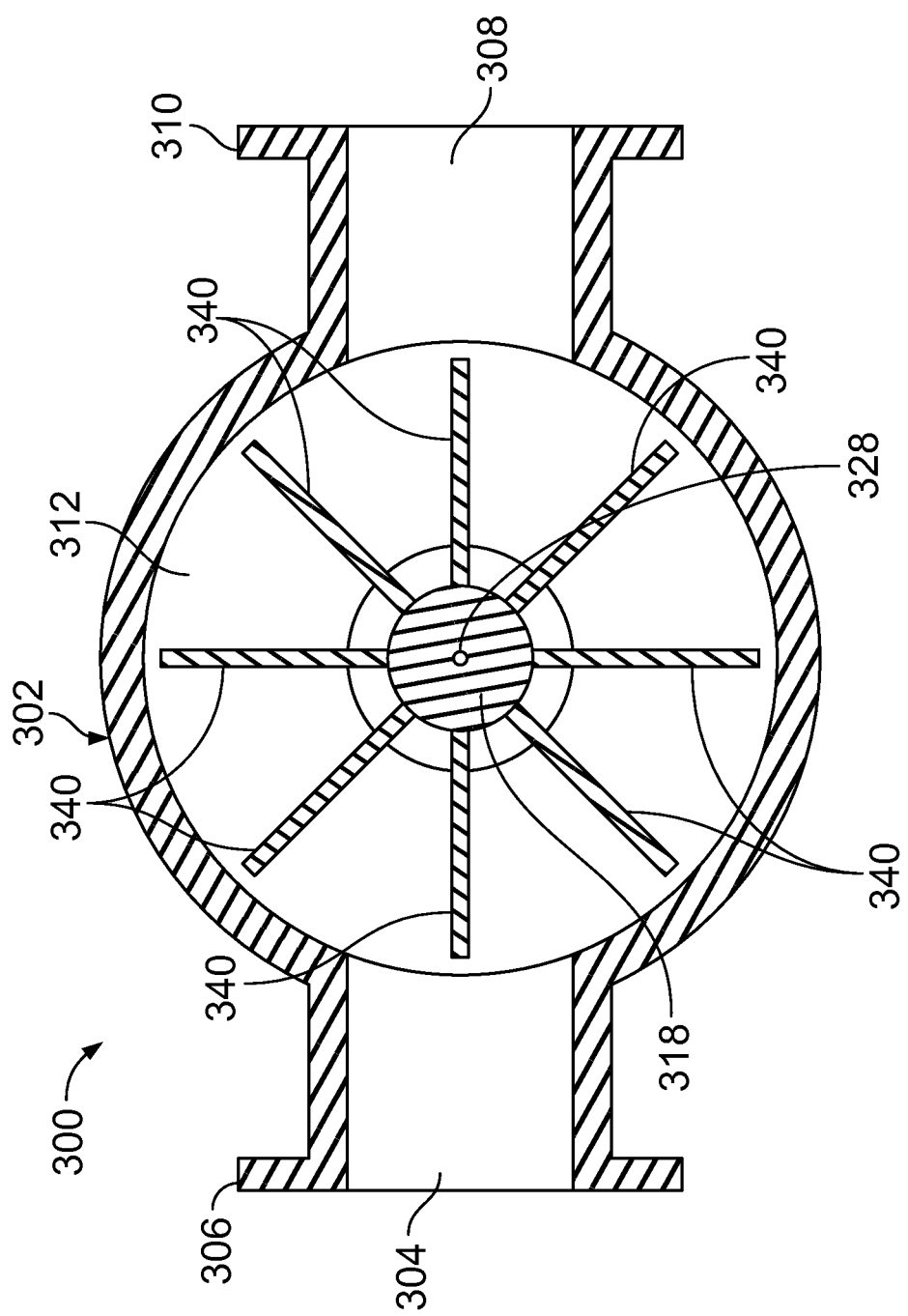
FIG. 9 illustrates a cross-sectional view of the flow control device of FIG. 7, taken along line 9-9 in FIG. 7.

Referring to FIGS. 7-9, a third example flow control device 300 includes a housing 302 that forms an inlet passage 304, an outlet passage 308, and a fluid passageway 312 between inlet passage 304 and outlet passage 308. A first radial flange 306 can extend around and be positioned at an end of inlet passage 304 and a second radial flange 310 can extend around and be positioned at an end of outlet passage 308 to allow flow control device 300 to be installed in a fluid system and to maintain face-to-face requirements, making flow control device 300 retrofittable in place of existing pressure control valves.

A shaft 318 is positioned entirely within housing 302 between inlet passage 304 and outlet passage 308, such that no portion of shaft 318 extends external to housing 302. As shown, shaft 318 can have at least one first magnet 322 secured to shaft 318 proximate a first end 320 of shaft 318 and at least one second magnet 326 secured to shaft 318 proximate a second end 324 of shaft 318, opposite first end 320, forming a rotor. Alternatively, rather than securing magnets to the shaft, shaft 318 itself can be magnetized, eliminating the need for first magnet 322 and second magnet 326. A first cavity 314 is formed in housing 302 and extends outwardly from fluid passageway 312 and a second cavity 316 is formed in housing 302, opposite first cavity 314, and extends outwardly from fluid passageway 312. First end 320 of shaft 318 is received in first cavity 314 and second end 324 of shaft 318 is received in second cavity 316. One or more bearings, O-rings, or other seals 350 can be positioned around first end 320 and second end 324 of shaft 318 to support shaft 318 in first cavity 314 and second cavity 316 and allow rotation of shaft 318 in first cavity 314 and second cavity 316. Providing shaft 318 entirely within housing 302 creates a sealed device with no external leak path and, therefore, no emissions. In addition, no packing is required since there is no shaft, valve stem, or other structure extending through or external of housing 302 to control any internal element.

A plurality of vanes 340 are secured to and extend radially from shaft 318 and are positioned in fluid passageway 312 to form a type of paddle wheel or turbine. Vanes 340 can have various shapes and/or sizes that will allow fluid flowing through housing 302 to engage vanes 340 and provide a force against vanes 340 to turn shaft 318. Efficiency gains can also be realized by changing the size/shape of vanes 340 and/or the size/shape of housing 302 (e.g., angle body, Y body, etc.). Vanes 340 can be secured to shaft 318 in any manner desired, such as bolting vanes 340 to shaft 318, welding vanes 340 to shaft 318, press fitting vanes 340 to shaft 318, fitting vanes 340 into grooves machined into shaft 318, threading bars into shaft 318 and attaching vanes 340 to the bars, etc. Vanes 340 can be secured to shaft 318 after shaft 318 has been positioned within housing 302 or vanes 340 can be secured to shaft 318 outside of housing 302 and shaft 318 and vanes 340 positioned within housing 302 as a unit. Alternatively, rather than separate vanes being secured to the shaft, vanes 340 and shaft 318 could be a single, integral, unitary structure (e.g., vanes 340 and shaft 318 could be machined or 3D printed as a single unit).

A first wire coil 342 is positioned around first end 320 of shaft 318 (and in the example shown around first magnet 322) and a second wire coil 346 is positioned around second end 324 of shaft 318 (and in the example shown around second magnet 326) forming stators. First wire coil 342 and second wire coil 346 are external of housing 302 such first wire coil 342 is positioned around first cavity 314 and is linearly moveable in a direction parallel to a longitudinal axis 328 of shaft 318 and second wire coil 346 is positioned around second cavity 316 and is linearly moveable in a direction parallel to longitudinal axis 328. First wire coil 342 and second wire coil 346 can each be a single coil of wire or can includes multiple coils mounted in series in a cylindrical pattern. As shown, first wire coil 342 can be wrapped around and mounted to a generally cylindrical non-magnetic armature 344 and second wire coil 346 can be wrapped around and mounted to a generally cylindrical non-magnetic second armature 348. Armature 344 and second armature 348 can be connected to respective actuators or to a common actuator (e.g., and electrical or pneumatic actuator(s)) (not shown) to move armature 344 and second armature 348, and therefore first wire coil 342 and second wire coil 346, linearly back and forth along longitudinal axis 328 of shaft 318.

As fluid flows through flow control device 300, the fluid engages plurality of vanes 340 and rotates shaft 318. Moving first wire coil 342 over first end 320 of shaft 318, and first magnet 322 if used, and second wire coil 346 over second end 324 of shaft 318, and second magnet 326 if used, creates a current in first wire coil 342 and second wire coil 346 and creates electromagnetic induction, which slows the rotation of shaft 318 and increases the pressure drop in flow control device 300. First wire coil 342 and second wire coil 346 can be moved toward housing 302, which will cause more of first end 320 of shaft 318 (and first magnet 322) to be covered by first wire coil 342 and second end 324 of shaft 318 (and second magnet 326) to be covered by second wire coil 346, increasing the induced magnetic field, increasing the resistance to the flow of the fluid, and increasing the pressure drop. Conversely, first wire coil 342 and second wire coil 346 can also be moved away from housing 302, which will cause less of first end 320 of shaft 318 (and first magnet 322) to be covered by first wire coil 342 and less of second end 324 of shaft 318 (and second magnet 326) to be covered by second wire coil 346, decreasing the induced magnetic field, decreasing the resistance to flow of the fluid, and decreasing the pressure drop. Therefore, the pressure drop created by flow control device 300 can be controlled by the positioning of first wire coil 342 over first end 320 of shaft 318 (and first magnet 322) and of second wire coil 346 over second end 324 of shaft 318 (and second magnet 326). Using separate wire coils (stators) that each interact with an opposite end of shaft can provide more resistance to the flow of fluid, harness more energy, and allow for a greater pressure drop through flow control device 300, compared to the use of a single wire coil positioned around one end of a shaft, as shown in flow control device 100 and flow control device 200.

Figure 10:
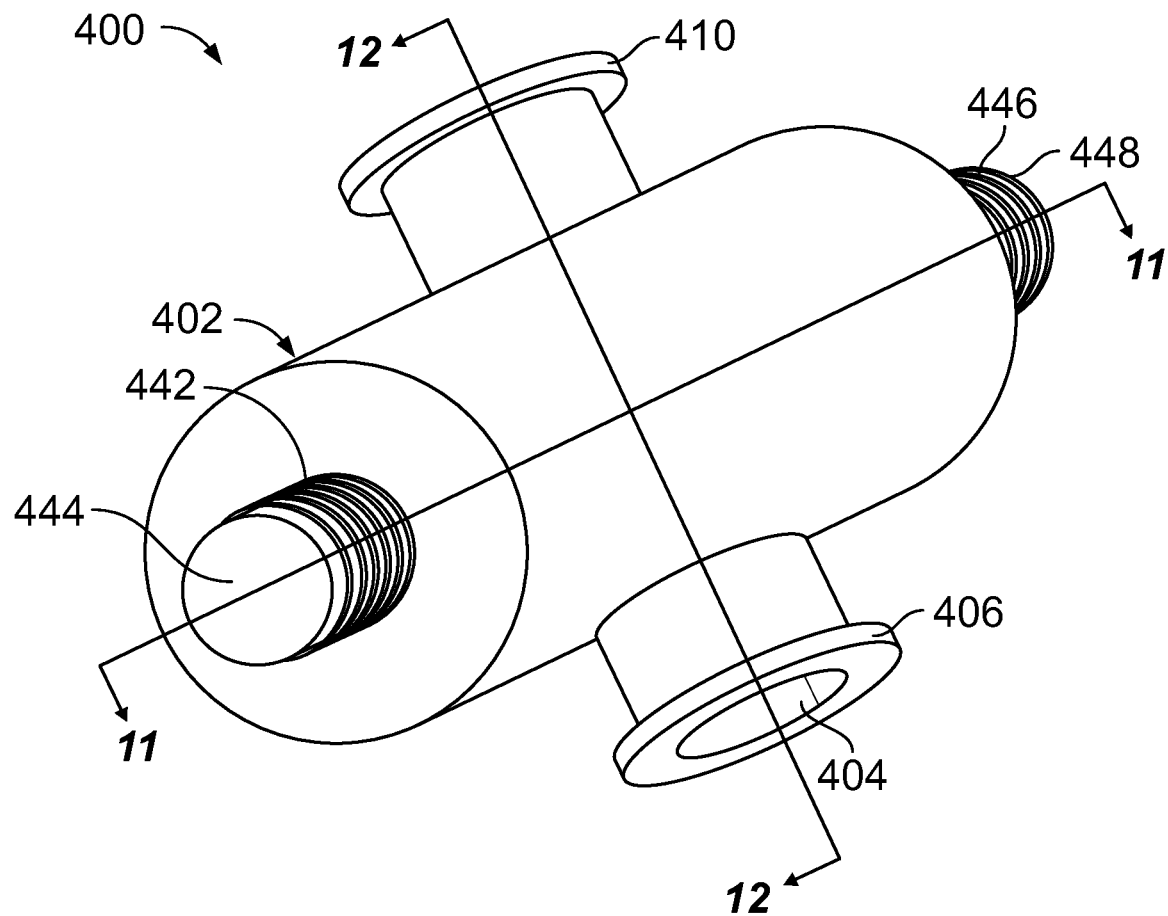
FIG. 10 illustrates a perspective view of a fourth example flow control device.
Figure 11:
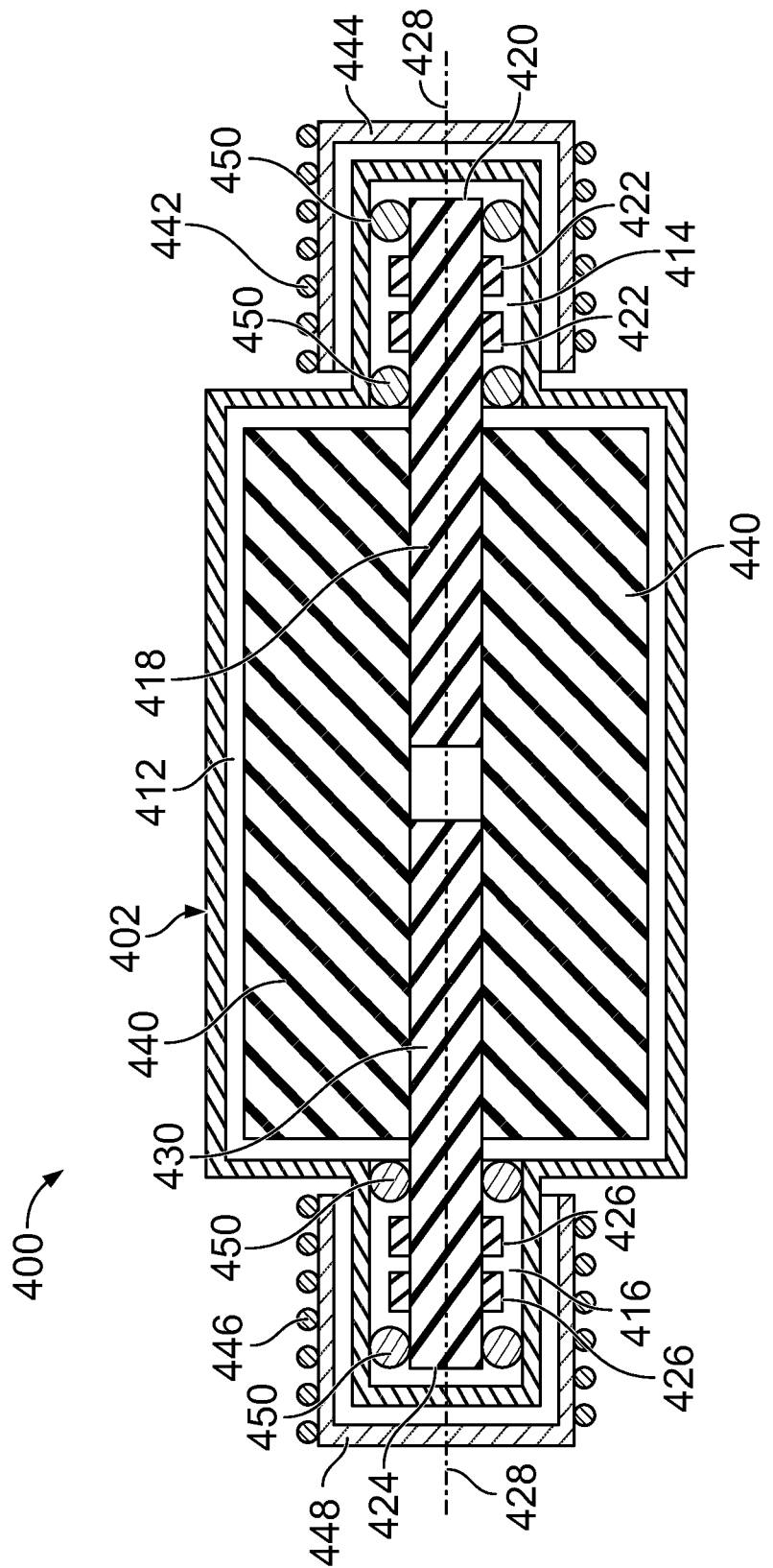
FIG. 11 illustrates a cross-sectional view of the flow control device of FIG. 10, taken along line 11-11 in FIG. 10.
Figure 12:
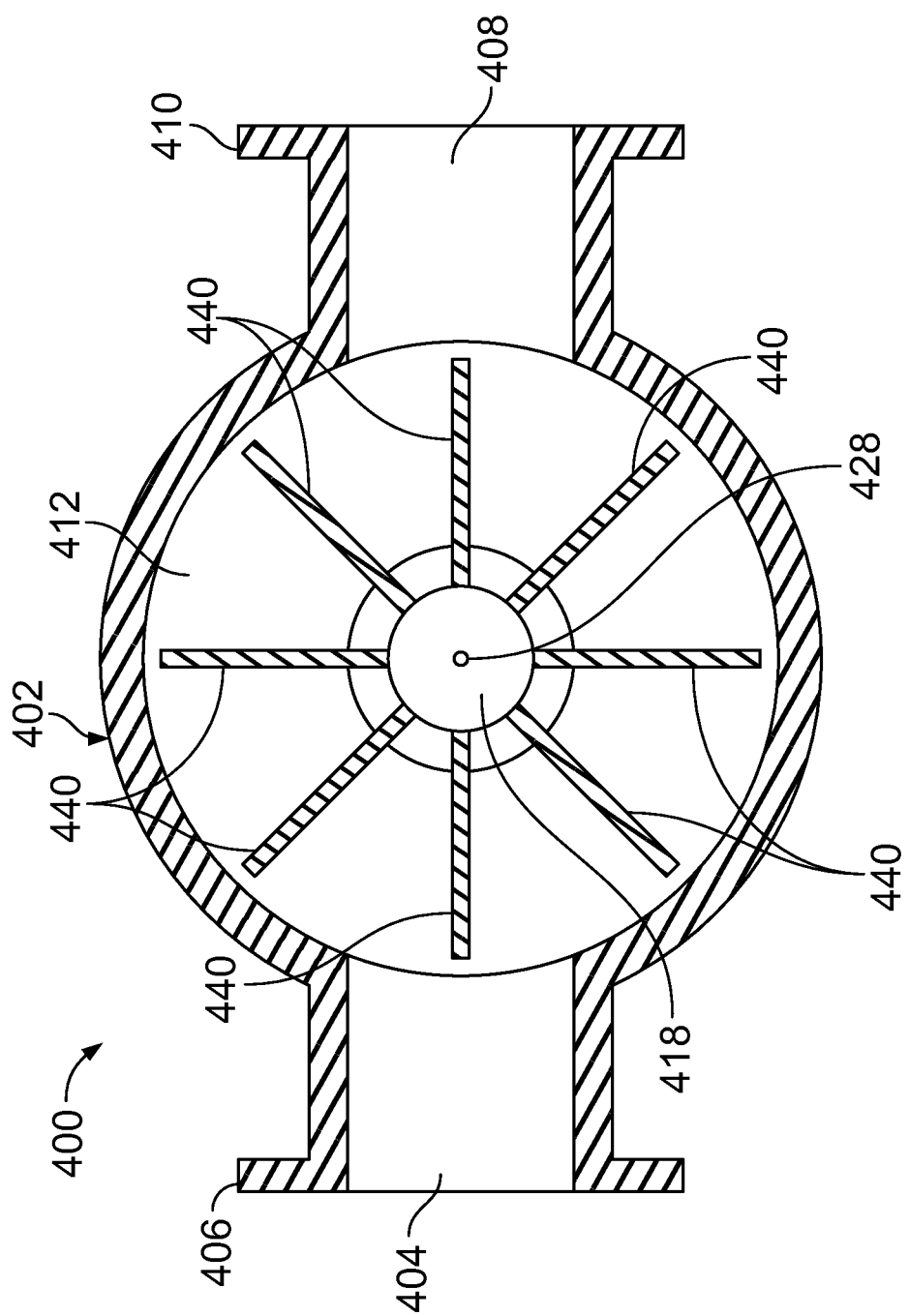
FIG. 12 illustrates a cross-sectional view of the flow control device of FIG. 10, taken along line 12-12 in FIG. 10.

Referring to FIGS. 10-12, a fourth example flow control device 400 includes a housing 402 that forms an inlet passage 404, an outlet passage 408, and a fluid passageway 412 between inlet passage 404 and outlet passage 408. A first radial flange 406 can extend around and be positioned at an end of inlet passage 404 and a second radial flange 410 can extend around and be positioned at an end of outlet passage 408 to allow flow control device 400 to be installed in a fluid system and to maintain face-to-face requirements, making flow control device 400 retrofittable in place of existing pressure control valves.

A shaft 418 and a second shaft 430 are coaxially aligned and are positioned entirely within housing 402 between inlet passage 404 and outlet passage 408, such that no portion of shaft 418 or second shaft 430 extends external to housing 402. As shown, shaft 418 can have at least one first magnet 422 secured to shaft 418 proximate a first end 420 of shaft 218 and second shaft 430 can have at least one second magnet 436 secured to second shaft 430 proximate a second end 434 of second shaft 430, forming a rotor. Alternatively, rather than securing magnets to the shafts, shaft 418 and second shaft 430 themselves can be magnetized, eliminating the need for first magnet 422 and second magnet 436. A first cavity 414 is formed in housing 402 and extends outwardly from fluid passageway 412 and a second cavity 416 is formed in housing 402, opposite first cavity 414, and extends outwardly from fluid passageway 412. First end 420 of shaft 418 is received in first cavity 414 and a second end 434 of second shaft 430 is received in second cavity 416. One or more bearings, O-rings, or other seals 450 can be positioned around first end 420 of shaft 418 and second end 434 of second shaft 430 to support shaft 418 in first cavity 414 and second shaft 430 in second cavity 416 and allow rotation of shaft 418 in first cavity 414 and second shaft 430 in second cavity 416. Providing shaft 418 and second shaft 430 entirely within housing 402 creates a sealed device with no external leak path and, therefore, no emissions. In addition, no packing is required since there is no shaft, valve stem, or other structure extending through or external of housing 402 to control any internal element.

A plurality of vanes 440 are secured to and extend radially from shaft 418 and second shaft 430 and are positioned in fluid passageway 412 to form a type of paddle wheel or turbine. Vanes 440 can have various shapes and/or sizes that will allow fluid flowing through housing 402 to engage vanes 440 and provide a force against vanes 440 to turn shaft 418 and second shaft 430. Efficiency gains can also be realized by changing the size/shape of vanes 440 and/or the size/shape of housing 402 (e.g., angle body, Y body, etc.). Vanes 440 can be secured to shaft 418 and second shaft 430 in any manner desired, such as bolting vanes 440 to shaft 418 and second shaft 430, welding vanes 440 to shaft 418 and second shaft 430, press fitting vanes 440 to shaft 418 and second shaft 430, fitting vanes 440 into grooves machined into shaft 418 and second shaft 430, threading bars into shaft 418 and second shaft 430 and attaching vanes 440 to the bars, etc. Vanes 440 can be secured to shaft 418 and second shaft 430 after shaft 418 and second shaft 430 have been positioned within housing 402 or vanes 440 can be secured to shaft 418 and second shaft 430 outside of housing 402 and shaft 418, second shaft 430, and vanes 440 positioned within housing 402 as a unit. Alternatively, rather than separate vanes being secured to the shaft, vanes 440, shaft 418, and second shaft 430 could be a single, integral, unitary structure (e.g., vanes 440, shaft 418, and second shaft 430 could be machined or 3D printed as a single unit).

A first wire coil 442 is positioned around first end 420 of shaft 418 (and in the example shown around first magnet 422) and a second wire coil 446 is positioned around second end 434 of second shaft 430 (and in the example shown around second magnet 436) forming stators. First wire coil 442 and second wire coil 446 are external of housing 402 such first wire coil 442 is positioned around first cavity 414 and is linearly moveable in a direction parallel to a longitudinal axis 428 of shaft 418 and second wire coil 446 is positioned around second cavity 416 and is linearly moveable in a direction parallel to longitudinal axis 428 and longitudinal axis 438 of second shaft 430. First wire coil 442 and second wire coil 446 can each be a single coil of wire or can includes multiple coils mounted in series in a cylindrical pattern. As shown, first wire coil 442 can be wrapped around and mounted to a generally cylindrical non-magnetic armature 444 and second wire coil 446 can be wrapped around and mounted to a generally cylindrical non-magnetic second armature 448. Armature 444 and second armature 448 can be connected to respective actuators or to a common actuator (e.g., and electrical or pneumatic actuator(s)) (not shown) to move armature 444 and second armature 448, and therefore first wire coil 442 and second wire coil 446, linearly back and forth along longitudinal axis 428 of shaft 418 and longitudinal axis 438 of second shaft 430.

As fluid flows through flow control device 400, the fluid engages plurality of vanes 440 and rotates shaft 418 and second shaft 430. Moving first wire coil 442 over first end 420 of shaft 418, and first magnet 422 if used, and second wire coil 446 over second end 434 of second shaft 430, and second magnet 436 if used, creates a current in first wire coil 442 and second wire coil 446 and creates electromagnetic induction, which slows the rotation of shaft 418 and second shaft 430 and increases the pressure drop in flow control device 400. First wire coil 442 and second wire coil 446 can be moved toward housing 402, which will cause more of first end 420 of shaft 418 (and first magnet 422) to be covered by first wire coil 442 and second end 434 of second shaft 430 (and second magnet 436) to be covered by second wire coil 446, increasing the induced magnetic field, increasing the resistance to the flow of the fluid, and increasing the pressure drop. Conversely, first wire coil 442 and second wire coil 446 can also be moved away from housing 402, which will cause less of first end 420 of shaft 418 (and first magnet 422) to be covered by first wire coil 442 and less of second end 434 of second shaft 430 (and second magnet 436) to be covered by second wire coil 446, decreasing the induced magnetic field, decreasing the resistance to flow of the fluid, and decreasing the pressure drop. Therefore, the pressure drop created by flow control device 400 can be controlled by the positioning of first wire coil 442 over first end 420 of shaft 418 (and first magnet 422) and of second wire coil 446 over second end 434 of second shaft 430 (and second magnet 436). Using separate wire coils (stators) that each interact with an Using separate wire coils (stators) that each interact with a separate shaft can provide more resistance to the flow of fluid, harness more energy, and allow for a greater pressure drop through flow control device 400, compared to the use of a single wire coil positioned around one end of a shaft, as shown in flow control device 100 and flow control device 200.

Figure 13:
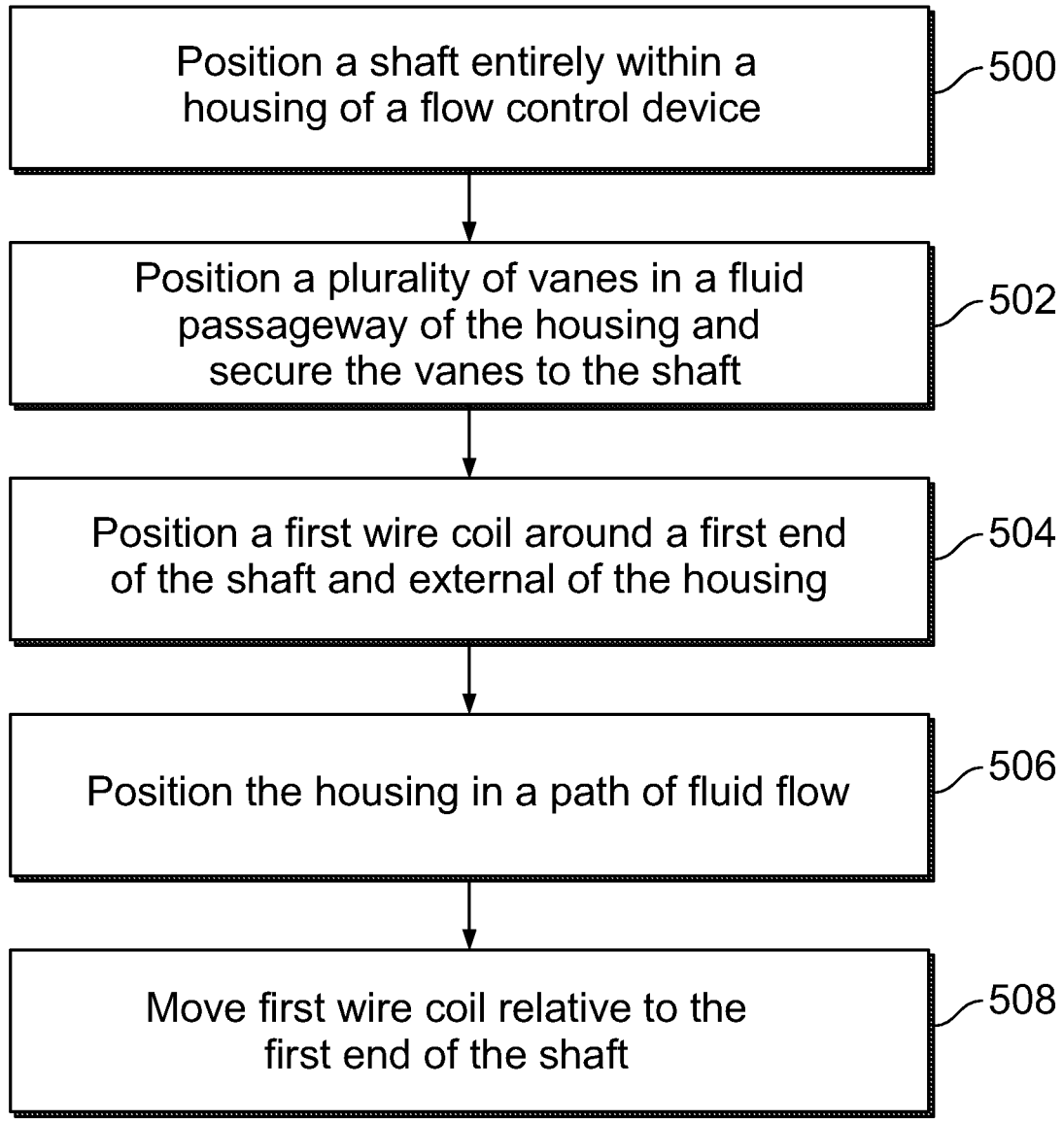
FIG. 13 illustrates a flowchart of an example method of pressure control in a fluid flow.

Referring to FIG. 13, a method of pressure control in a fluid flow (e.g., using a flow control device 100, 200, 300, 400) is illustrated.

At Step 500, a shaft (e.g., shaft 118, 218, 318, 418) is positioned entirely within a housing (e.g., housing 102, 202, 302, 402). The shaft can have a magnet (e.g., first magnet 122, 222, 322, 422) secured proximate a first end (e.g., first end 120, 220, 320, 420) of the shaft or the shaft itself can be magnetized. If a fluid control device (e.g., fluid control device 300) having one shaft and two wire coils is used, the shaft can also have a second magnet (e.g., second magnet 326) secured proximate a second end (e.g., second end 324) of the shaft, if the shaft itself is not magnetized.

At Step 502, a plurality of vanes (e.g., vanes 140, 240, 340, 440) are positioned in a fluid passageway (e.g., fluid passageway 112, 212, 312, 412) of the housing and are secured to the shaft. If a fluid control device (e.g., fluid control device 200, 400) having two shafts (e.g., second shaft 230, 430) is used, the plurality of vanes are also secured to the second shaft. The plurality of vanes can be secured to the shaft(s) after the shaft(s) has been positioned within the housing or the plurality of vanes can be secured to the shaft(s) outside of the housing and the shaft(s) and vanes positioned within the housing as a unit. Alternatively, rather than separate vanes being secured to the shaft, the vanes and shaft could be a single, integral, unitary structure (e.g., the vanes and shaft could be machined or 3D printed as a single unit).

At Step 504, a first wire coil (e.g., first wire coil 142, 242, 342, 442) is positioned around a first end (e.g., first end 120, 220, 320, 420) of the shaft such that the first wire coil is external of the housing and linearly moveable in a direction parallel to a longitudinal axis (e.g., longitudinal axis 128, 228, 328, 428) of the shaft. If a fluid control device (e.g., fluid control device 300) with two wire coils (e.g., first wire coil 342 and second wire coil 346) is used, the second wire coil (e.g., second wire coil 346) is positioned around a second end (e.g., second end 324) of the shaft such that the second wire coil is external of the housing and linearly moveable in a direction parallel to the longitudinal axis of the shaft. If a fluid control device (e.g., fluid control device 400) with two shaft (e.g., shaft 418 and second shaft 430) and two wire coils (e.g., first wire coil 442 and second wire coil 446) is used, the second wire coil (e.g., second wire coil 446) is positioned around a second end (e.g., second end 434) of the second shaft (e.g., second shaft 430) such that the second wire coil is external of the housing and linearly moveable in a direction parallel to a longitudinal axis (e.g., longitudinal axis 438) of the second shaft.

At Step 506, the housing of the flow control device is then positioned in a path of the fluid flow. For example, the housing can be secured between two existing pipes or other structures via a first flange (e.g., first radial flange 106, 206, 306, 406) and a second flange (e.g., second radial flange 110, 210, 310, 410) on the housing.

At Step 508, once the housing has been positioned in a path of the fluid flow, the pressure in the fluid flow can then be controlled by moving the first wire coil relative to the end of the shaft to control the resistance provided by the vanes and, therefore, the pressure of the fluid flow through the flow control device. If a second wire coil is also used, the second wire coil can also be moved relative to the second end of the shaft (or a second shaft) to further assist in the control of the resistance provided by the vanes and, therefore, the pressure of the fluid flow through the fluid control device.

The figures and description provided herein depict and describe a preferred embodiment for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the methods and components disclosed herein without departing from the spirit and scope defined in the appended claims.

What is claimed is:

1. A flow control device, comprising:
   a housing forming an inlet passage, an outlet passage, and a fluid passageway between the inlet passage and the outlet passage;
   a magnetized shaft positioned entirely within the housing between the inlet passage and the outlet passage;
   a plurality of vanes secured to the magnetized shaft and positioned in the fluid passageway; and
   a first wire coil moveably positioned around a first end of the magnetized shaft, the first wire coil being external of the housing and linearly moveable in a direction parallel to a longitudinal axis of the magnetized shaft.

2. The flow control device of claim 1, comprising a first radial flange extending around and positioned at an end of the inlet passage and a second radial flange extending around and positioned at an end of the outlet passage.

3. The flow control device of claim 1, comprising a first cavity formed in the housing, the first cavity extending from the fluid passageway and configured to receive the first end of the magnetized shaft.

4. The flow control device of claim 3, wherein the first wire coil is positionable around the first cavity.

5. The flow control device of claim 1, comprising a second wire coil moveably positioned around a second end of the magnetized shaft, the second wire coil being external of the housing and linearly moveable in a direction parallel to the longitudinal axis of the magnetized shaft.

6. The flow control device of claim 5, comprising a second cavity formed in the housing, the second cavity extending from the fluid passageway and configured to receive a second end of the magnetized shaft, wherein the second wire coil is positionable around the second cavity.

7. The flow control device of claim 1, comprising: a second magnetized shaft positioned entirely within the housing between the inlet passage and the outlet passage, wherein the plurality of vanes are secured to the second magnetized shaft; and a second wire coil moveably positioned around a second end of the second magnetized shaft, the second wire coil being external of the housing and linearly moveable in a direction parallel to the longitudinal axis of the second magnetized shaft.

8. A flow control device, comprising:
   a housing forming an inlet passage, an outlet passage, and a fluid passageway between the inlet passage and the outlet passage;
   a shaft positioned entirely within the housing between the inlet passage and the outlet passage;
   a first magnet secured to the shaft proximate a first end of the shaft;
   a plurality of vanes secured to the shaft and positioned in the fluid passageway; and
   a first wire coil moveably positioned around the first end of the shaft, the first wire coil being external of the housing and linearly moveable in a direction parallel to a longitudinal axis of the shaft.

9. The flow control device of claim 8, comprising a first radial flange extending around and positioned at an end of the inlet passage and a second radial flange extending around and positioned at an end of the outlet passage.

10. The flow control device of claim 8, comprising a first cavity formed in the housing, the first cavity extending from the fluid passageway and configured to receive the first end of the shaft.

11. The flow control device of claim 10, wherein the first wire coil is positionable around the first cavity.

12. The flow control device of claim 8, comprising a second magnet secured to the shaft proximate a second end of the shaft, opposite the first end of the shaft, and a second wire coil moveably positioned around the second end of the shaft, the second wire coil being external of the housing and linearly moveable in a direction parallel to the longitudinal axis of the shaft.

13. The flow control device of claim 12, comprising a second cavity formed in the housing, the second cavity extending from the fluid passageway and configured to receive the second end of the shaft, wherein the second wire coil is positionable around the second cavity.

14. The flow control device of claim 8, comprising: a second shaft positioned entirely within the housing between the inlet passage and the outlet passage, wherein the plurality of vanes are secured to the second shaft; a second magnet secured to the second shaft proximate a second end of the second shaft; and a second wire coil moveably positioned around the second end of the second shaft, the second wire coil being external of the housing and linearly moveable in a direction parallel to the longitudinal axis of the second shaft.

15. A method of pressure control in a fluid flow, comprising:
positioning a shaft entirely within a housing, the housing forming an inlet passage, an outlet passage, and a fluid passageway between the inlet passage and the outlet passage;
securing a plurality of vanes to the shaft and positioning the plurality of vanes in the fluid passageway;
positioning a first wire coil around a first end of the shaft, the first wire coil being external of the housing and linearly moveable in a direction parallel to a longitudinal axis of the shaft;
positioning the housing in a path of the fluid flow; and
moving the first wire coil relative to the first end of the shaft to control the pressure in the fluid flow.

16. The method of claim 15, wherein the shaft is magnetized.

17. The method of claim 15, comprising securing a magnet proximate the first end of the shaft.

18. The method of claim 15, comprising positioning a second wire coil around a second end of the shaft, the second wire coil being external of the housing and linearly moveable in a direction parallel to the longitudinal axis of the shaft, and moving the second wire coil relative to the second end of the shaft to control the pressure of the fluid flow.

19. The method of claim 15, comprising:
positioning a second shaft entirely within the housing, securing the plurality of vanes to the second shaft;
positioning a second wire coil around a second end of the second shaft, the second wire coil being external of the housing and linearly moveable in a direction parallel to a longitudinal axis of the second shaft; and
moving the second wire coil relative to the second end of the second to control the pressure in the fluid flow.

20. The method of claim 19, wherein the second shaft is magnetized or a second magnet is secured proximate the second end of the second shaft.

* * * * *

UNITED STATES PATENT AND TRADEMARK OFFICE
CERTIFICATE OF CORRECTION

PATENT NO. : 12,265,404 B2  
APPLICATION NO. : 18/237285  
DATED : April 1, 2025  
INVENTOR(S) : Ryan McIntosh et al.

Page 1 of 1

It is certified that error appears in the above-identified patent and that said Letters Patent is hereby corrected as shown below:

In the Specification

At Column 1, Line 26, "issues" should be -- issues with --.

At Column 3, Line 10, "from," should be -- form, --.

At Column 3, Line 12, "from," should be -- form, --.

At Column 3, Line 19, "from," should be -- form, --.

At Column 3, Line 28, "from," should be -- form, --.

At Column 5, Line 28, "and" should be -- an --.

At Column 6, Line 58, "and" should be -- an --.

At Column 8, Line 10, "such" should be -- such that --.

At Column 8, Line 24, "and" should be -- an --.

At Column 10, Line 1, "such" should be -- such that --.

At Column 10, Line 16, "and" should be -- an --.

Signed and Sealed this  
Tenth Day of February, 2026

John A. Squires  
*Director of the United States Patent and Trademark Office*